United States Patent
Wallenius

(10) Patent No.: US 6,999,781 B1
(45) Date of Patent: Feb. 14, 2006

(54) CONFIGURATION OF INTELLIGENT NETWORK SERVICE

(75) Inventor: Jukka Wallenius, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/439,187

(22) Filed: Nov. 12, 1999

Related U.S. Application Data

(63) Continuation of application No. PCT/FI99/00205, filed on Mar. 17, 1999.

(30) Foreign Application Priority Data

Mar. 17, 1998 (FI) .................................... 980588

(51) Int. Cl.
*H04Q 7/20* (2006.01)

(52) U.S. Cl. ............... 455/466; 455/414; 455/403; 370/328

(58) Field of Classification Search ............. 455/466, 455/414, 418, 419, 422, 432, 435, 550, 558
See application file for complete search history.

(56) References Cited

U.S. PATENT DOCUMENTS

| | | | | |
|---|---|---|---|---|
| 6,049,712 A | * | 4/2000 | Wallinder | 455/414 |
| 6,144,849 A | * | 11/2000 | Nodoushani et al. | 455/419 |

FOREIGN PATENT DOCUMENTS

| | | |
|---|---|---|
| EP | 0 562 890 | 9/1993 |
| EP | 0812120 A2 * | 12/1997 |
| EP | 0 812 120 | 5/1999 |
| WO | WO 95/26114 | 9/1995 |

OTHER PUBLICATIONS

M. Mouly and M. Pautet, *The GSM System for Mobile Communications*, Palaiseau, France, 1992, ISBN:2-9507190-0-7.

* cited by examiner

Primary Examiner—Erika A. Gary
Assistant Examiner—S. Smith
(74) Attorney, Agent, or Firm—Squire, Sanders & Dempsey LLP

(57) ABSTRACT

A method of configuring an intelligent network service over a user interface of a mobile station. The mobile station (MS) comprises an extension layer (MEXE) to support routines to be installed. The mobile station is loaded (4-2) with a configuration routine of the intelligent network service in question. The extension layer (MEXE) receives an input (4-3a) through the configuration routine in order to configure the intelligent network service. On the basis of the input, the mobile station (MS) transmits configuration information to a mobile services switching centre (MSC) in a configuration message (4-3d). The mobile services switching centre (MSC) recognized the configuration message (4-3d) and transmits at least the essential part thereof to a service control point (SCP). The service control point (SCP) interprets the configuration information included in the configuration message (4-3d) and configures the intelligent network service.

16 Claims, 2 Drawing Sheets

CONFIGURATION OF INTELLIGENT NETWORK SERVICE

This application is a CON of PCT/FI99/00205 filed on Mar. 17, 1999.

BACKGROUND OF THE INVENTION

The invention relates to the configuration of an intelligent network service over a user interface of a mobile station.

In the prior art, an intelligent network service offered to a mobile station is configured in a manner such that as a response to dialling by the user the mobile station sends dual tone multi-frequency (DTMF) sounds which are interpreted by a receiving mobile exchange. For example, call forwarding to a number 123456 can be implemented by dialling a character string *21*#123456#. This character string, though rather complicated, can only be used for configuring a very simple service: in the above example the call is unconditionally forwarded to a given fixed number. Special characters delivered from a keypad are very difficult to use for configuring such a service as reachability profile in which a call is during office hours attempted first to an office telephone for 5 seconds, next a mobile phone for 8 seconds and if this also fails, the call is transferred to a voice mail service. Outside office hours the call is first attempted to a home telephone.

A problem in the above arrangement is thus that unreasonable long number strings have to be entered from the user interface of a mobile station. This takes a lot of time and demands great precision from the user. The configuration of the intelligent network service can be made easier for the user by generating audible prompts, such as "dial time as hours, minutes and press hash key" or "dial telephone number and press hash key". A problem in this technique is, for example, that the radio connection has to be allocated to the entire configuration time of the service.

BRIEF DESCRIPTION OF THE INVENTION

An object of the invention is thus to provide a method and equipment implementing the method so as to solve the above problems. The objects of the invention are achieved by a method and equipment, which are characterized by what is stated in the independent claims. The preferred embodiments of the invention are disclosed in the dependent claims.

The invention is on one hand based on the idea of loading a mobile telephone with a configuration routine, or at least a part of the configuration routine, of the intelligent network service in question. A particularly advantageous mechanism for executing the configuration routine is the extension of mobile station functionality known as a Mobile station EXecution Environment (MEXE), defined in recommendation ETSI (European Telecommunication Standard Institute) 02.57. In respect of the invention it is essential that the telephone comprises an MEXE-type extension layer, i.e. a software execution environment which includes interfaces towards both the user interface and the radio devices of the mobile station. The two interfaces are implemented through the basic functionality of the mobile station, and so MEXE does not need to function at a low machine-oriented level. Later in this application, an MEXE-type functionality is called "an extension layer".

The invention is on the other hand based on the idea of using an MEXE-type (or the like) extension layer of the mobile station for configuring the intelligent network service. The extension layer receives through a configuration routine an input for configuring the intelligent network service. The extension layer of the mobile station and/or the configuration routine convert configuration information between the human-oriented and machine oriented representations. The mobile station transmits the configuration information to a mobile services switching centre in a configuration message. The mobile services switching centre recognizes the configuration message and transmits at least an essential part thereof to a service control point which interprets the configuration information contained in the configuration message and configures the intelligent network service.

Configuration can be activated from the mobile station. Either the mobile station user may wish to change the configuration of the intelligent network service or the mobile station may activate configuration independently, in response to location update or time, for example.

Before the configuration message the mobile station may transmit a configuration information inquiry so as to load the current configuration information from the network. The configuration routine can be entirely installed in the mobile station (in the MEXE extension layer) when the intelligent network service is subscribed to from an operator or a service provider, i.e. before the configuration of the intelligent network service. Alternatively, the configuration routine can be installed in the mobile station only partly (or not at all) before the transmission of the configuration message, and the network transmits the configuration routine, or at least the missing parts of the routine, as a response to a configuration information inquiry. The configuration routine can be loaded by using any circuit-switched or packet-switched connection or a data message (short message/USSD). The configuration routine can also be loaded in the memory of the mobile station or a SIM card therein by using a suitable programming device. The configuration routine is connected to the user interface of the mobile station, and the user then detects the existence of configuration by a changed user interface.

The mobile station may also store some of the latest configuration routines used, in which case the network may transmit the configuration routine, or the missing parts of the routine, only if requested by the mobile station. If the required configuration routine (and possibly the current configuration information) is stored in the memory of the mobile station, it is not necessary to inquire the configuration information until in connection with the first configuration event. At the next and the subsequent occasions the configuration message is sufficient.

In case the current configuration information of the intelligent network service is not stored in the memory of the subscriber station, it is preferable that the response to the configuration information inquiry contains the current configuration information and this information is presented to the mobile station user over the user interface of the mobile station. In that case the user does not need to start configuration from nothing. The configuration routine can receive the changes in configuration information over the user interface of the mobile station and transmit the changed configuration information to the network in the configuration message. In order to save radio resources only the changes that are made can be transmitted to the network.

If the configuration routine is installed in the mobile station before the transmission of the configuration message, the user can activate the configuration routine over the user interface of the mobile station and the configuration routine commands the mobile station to transmit the configuration message. The configuration routine may generate the configuration message automatically. In case the configuration routine is not installed in the mobile station before the transmission of the configuration message, the mobile station user can command the mobile station to transmit a configuration information inquiry. In that case the user has to know how to generate the configuration information inquiry. The mobile station can then execute the configuration routine in response to the reception of the current configuration information and/or the configuration routine from the network.

Configuration can also be activated from the intelligent network side from its service control point SCP. In that case the SCP can automatically transmit a notification to the mobile station in connection with the changes in the intelligent network service. Besides, or in addition, the SCP can automatically activate the loading of a new configuration routine for the mobile station (MS).

The messages between the mobile station and the mobile services switching centre are preferably transparent for the network portion between the mobile station and the mobile services switching centre. In other words, the network portion between the mobile station and the mobile services switching centre does not react to the messages in any way. The mobile services switching centre recognizes the messages and forwards them to the service control point of the intelligent network. The mobile services switching centre is able to recognize that the message is a configuration message on the basis of the fact that the message contains an identifier of the intelligent network service and preferably a special character which seldom occurs in a normal text. Alternatively, or in addition to the above, the network is able to recognize that the message is a configuration message on the basis of the fact that the mobile station transmits the message to a telephone number allocated to the intelligent network service.

The messages between the mobile station and the mobile services switching centre are preferably implemented by using a transport protocol implementing at least a subset of the functions of OSI model layers 1 to 4. The protocols of the upper layers, mostly the session and presentation layers, are implemented in the mobile station at the configuration routine and service control point by means of a service logic program.

Configuration messages are most conveniently data messages, such as short messages or USSD messages. In the GSM system, for example, the maximum length of a short message is 160 characters, but configuration messages longer than that can be divided among several short messages.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
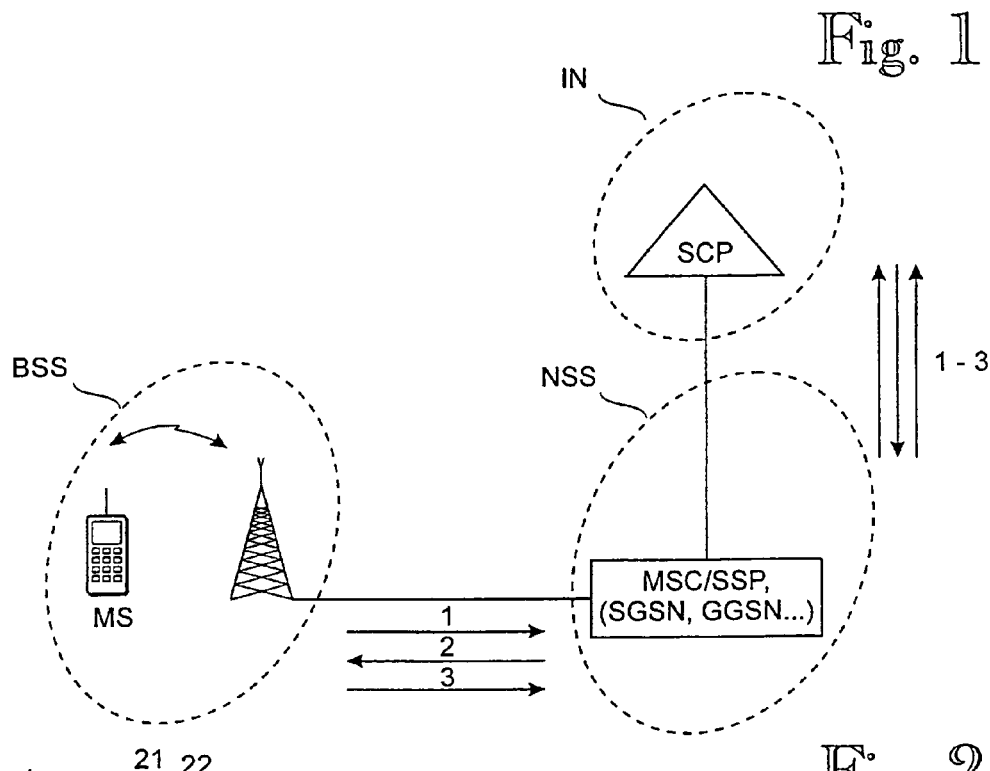
FIG. 1 shows a combination of a mobile communication system and an intelligent network.

FIG. 1 shows a combination of a mobile communication system of the GSM type and an intelligent network. A mobile station MS communicates through a base station subsystem BBS with a mobile services switching centre MSC belonging to a network subsystem NSS. The functionality of the mobile communication system is extended by means of an intelligent network IN. The operation of the intelligent network is controlled by a service control point SCP. Correspondingly, a service switching point SSP is associated with the mobile services switching centre MSC. Arrows 1 to 3 indicate configuration inquiries and configuration messages.

A service control function SCF normally includes all service logic and control associated with a service. The service control function is only a logical function which can be implemented internally in a variety of ways. It may be internally decentralized and the service logic associated therewith may be distributed over different nodes. Service information may also be distributed over nodes different from the ones associated with the service logic. A service management function SMF takes care of management, supply and introduction of services. A service management access function SMAF provides the functions offered by the SMF with a user interface. These functions are associated with functionality called the intelligent network IN, or an IN platform. The functions may be located at one or more nodes. The functions may also be differently distributed; the service control function, for example, may also carry out tasks of the service management function.

Figure 2:
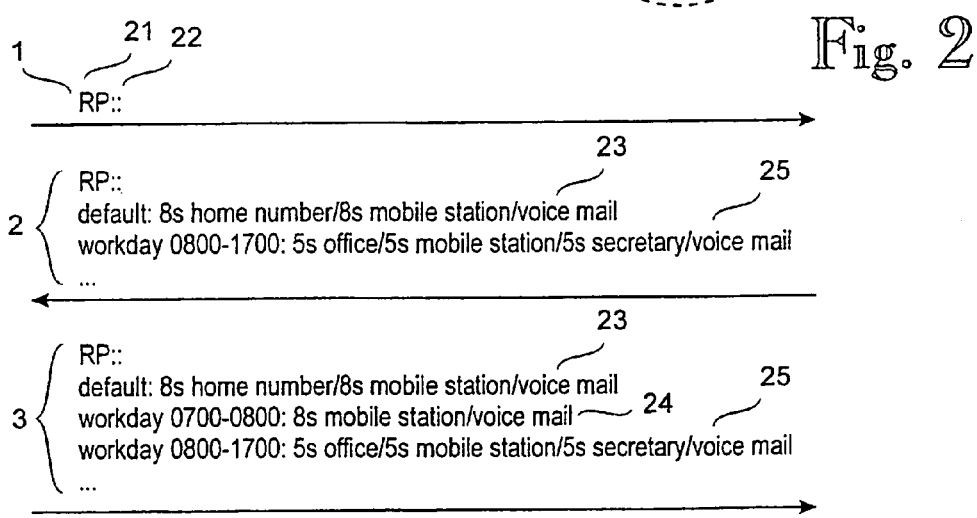
FIG. 2 shows configuration messages of an intelligent network service according to a first embodiment of the invention.

FIG. 2 shows configuration messages of an intelligent network service in detail, when reachability service is provided as an example of the intelligent network service. In connection with subscribing to the service, a routine, i.e. a script, is loaded in the mobile station MS. The execution of the routine presents the corresponding extension of the user interface. In this example, the configuration of a reachability profile begins in a manner such that the user transmits via the mobile station MS a configuration information inquiry 1 to the network, and the network recognizes the inquiry. The message 1 may be technically implemented as a short message or a USSD. The network, preferably the mobile services switching centre, recognizes the message mainly on the basis of special characters included in the message. Alternatively, the message may be recognized as a configuration message in a manner such that the message is transmitted to a given service number. In this example it is assumed that the special character is a service identifier 21, herein a reachability profile RP, followed by a special character 22 that seldom occurs in a normal text. In this case the special character 22 is two colons. The configuration messages of the reachability service are thus recognized by a character combination RP.

The mobile services switching centre MSC forwards the message 1 to the intelligent network service control point SCP. The service control point analyses the message 1 and detects that the mobile station user wishes to change his/her reachability profile. The service control point SCP transmits a message 2 containing the current configuration information to the mobile station MS, and the mobile station recognizes the message. The mobile station activates the configuration routine which is installed in it in connection with the delivery of the service. As a result of the execution of the routine, a user interface extension intended for configuring the intelligent network service is displayed on the display of the mobile station.

Generally, it is advantageous that the message 2 contains the current status information of the intelligent network service. In this example the message 2 contains the current status of the reachability profile. Let us assume that the reachability profile is defined to contain a set of records, including a day code (workday or day off) and a start time and an end time. Each record comprises an arbitrary number of sub-records, including a given telephone number and time indicating the duration of a call set-up attempt to the given telephone number. The reachability profile can be defined to contain such records as default: 8s home number/8s mobile station/voice mail
workday 0800–1700: 5s office/5s mobile station/5s secretary/voice mail The default is thus that the call is first attempted to the home number for 8 seconds, next to the mobile station for 8 seconds, and if this also fails, the call is connected to the voice mail service. During office hours between 8 a.m. and 5 p.m. the call is first attempted to the office telephone for 5 seconds, next to the mobile station for 5 seconds, next to the secretary for 5 seconds and finally to the voice mail service. In FIG. 2, a first record is referred to by 23 and a second record is referred to by 25. The configuration routine of the user interface enables the user to view and edit the current configuration information, i.e. the current situation of the reachability profile. Let us assume that the mobile station user adds a new definition according to which during workdays between 7 a.m. and 8 a.m., when the user is probably on his/her way to work, the call is attempted first to the mobile station for 8 seconds and next to the voice mail service. Technically, this takes place in a manner such that the user inserts a new record 24 between the records 23 and 35, the contents of the new record being: workday 0700–0800: 8s mobile station/voice mail.

In order to save radio resources, a configuration message 3 can only contain the changed records, in this case the record 24.

If the message 2 to be transmitted to the mobile station does not contain the current status information of the intelligent network service, the configuration routine of the user interface should store the current status information of the service in the memory of the mobile station. If this is not possible either, the user has to start the configuration of the service from the beginning each time, which is naturally laborious.

Figure 3:
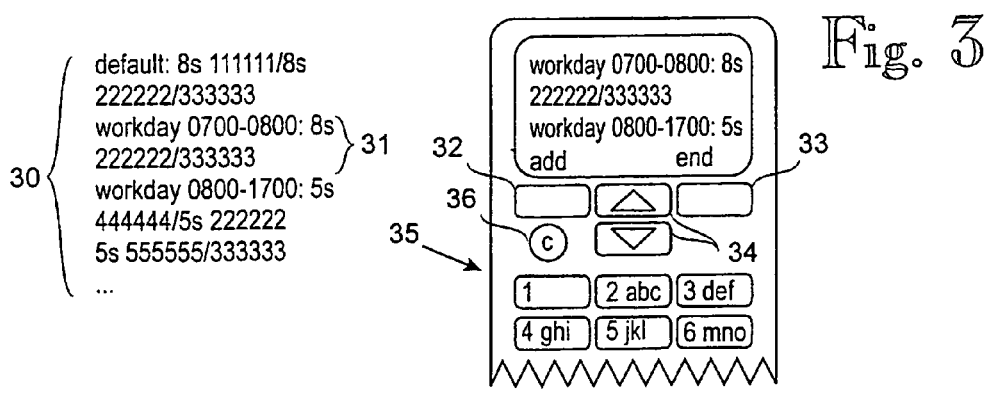
FIG. 3 shows configuration of an intelligent network service through the user interface of a mobile station.

FIGS. 2 and 3 show how the configuration of the intelligent network service may take place via an extended user interface of the mobile station. In FIG. 3 it is assumed that telephone numbers used are: home 111111, mobile station 222222, voice mail service 333333, office 444444 and secretary 55555.

When receiving the message 2, the mobile station MS recognizes the identifier 21 and/or the special character 22 of the intelligent network service from the message. By means of the identifier 21, the mobile station transmits the contents of the message 2, except for the identifier 21 of the service and the special characters 22, to the configuration routine of the service RP. The configuration routine formats the current status information of the service to suit the display of the mobile station. In this case this takes place by, for example, formatting the status information into a long string of text 30 whose width corresponds to the width of the mobile station display. A typical mobile station comprises arrow keys 34 with which the user can browse through the string of text up to the point where the text to be edited is displayed. Furthermore, the mobile station typically comprises programmable function keys 32 and 33, the function of the key being indicated above the keys. In this example, the key 32 inserts a new line and the key 33 completes the editing of information. Let us assume that the user has browsed through the string of text 30 until the cursor is at the point which corresponds to the start of the record 25. The user inserts a new record using the key 32 and writes the text corresponding to the record using an alphanumeric keypad 35 of the mobile station. Characters can be deleted with a correction key 36. The text corresponding to the inserted record 24 can be seen in the middle of the string of text 30 at 31. The user completes the editing using the key 33. Next, the mobile station may check if the user wishes to accept or reject the changes. If the user accepts the changes, the configuration routine commands the mobile station to transmit the third configuration message 3 through the mobile services switching centre MSC to the service control point SCP, which configuration message comprises, in addition to the identifiers 21 and 22, the changed configuration information of the intelligent network service. A simple user interface of the mobile station thus enables the configuration of a relatively complicated service.

In the above example it was assumed that the configuration routine of the user interface was installed in the memory of the mobile station MS. A typical digital mobile station is known to be composed of a mobile equipment and a subscriber identifier unit, such as a SIM card (Subscriber Identity Module). It is irrelevant to the invention in which of these two units the routine is stored. It may be more convenient for the user if the routine is stored in the SIM card, since the user may change the SIM card from one mobile equipment to another mobile station. If the configuration routine of the user interface is installed in the memory of the mobile station MS before the configuration of the mobile equipment of the intelligent network service, only the configuration message 3 can be transmitted in the second and subsequent configuration events.

In an alternative embodiment, it is conceivable that the configuration routine of the intelligent network service is loaded in the mobile station over a radio path in connection with the downward message 2. The loading of the routine in the mobile station can be activated in a manner such that the mobile station user transmits the message 1 which indicates the service identifier 21 and preferably the special character 22. Alternatively, the loading of the routine may be activated in a manner such that the memory of the mobile station comprises only a small user interface extension which indicates that the service in question is installed for the user. When the user wishes to configure the service in question, the user interface extension commands the mobile station to transmit the message 1, and as a response thereto, the service control point transmits the message 2 which contains, in addition to the current configuration information 23, 25 of the service, the routine needed for changing the information, i.e. the routine whose operation was described in connection with FIG. 3. A compromise would be to store in the memory of the mobile station some of the latest routines used, in which case routines that are most seldom used have to be loaded over the radio path. In that case the message 1 contains an indication of whether it is necessary to load the message 2 with the current configuration information 23, 25, or also the routine intended for editing the information.

Figure 4:
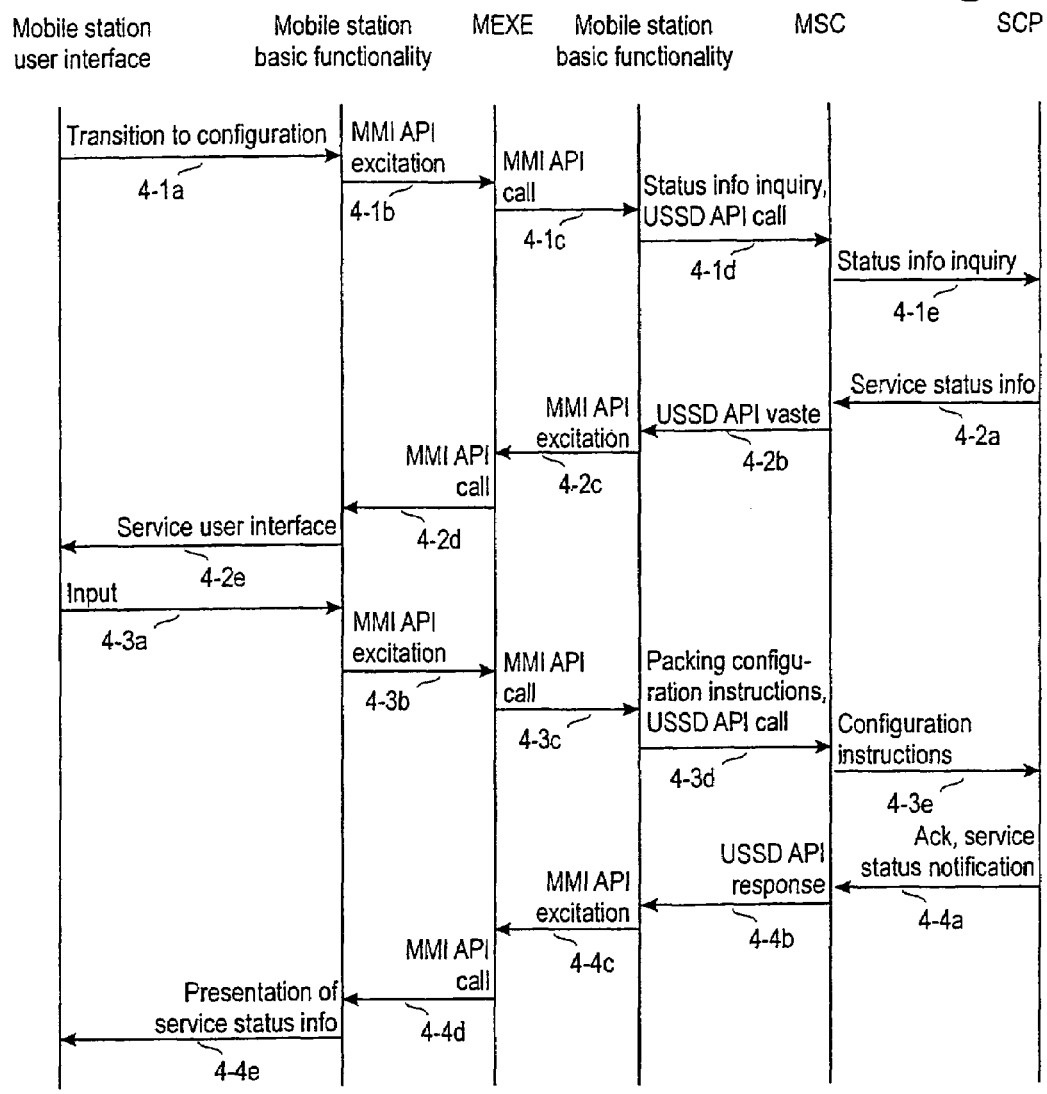
FIGS. 4 and 5 are signalling diagrams illustrating the invention.

FIG. 4 is a signalling diagram illustrating the invention. FIG. 4 shows the following signalling layers. A user interface of the mobile station is a layer through which the user communicates with the mobile station. MEXE is a MEXE-type extension layer of the mobile station. A part of the mobile station other than the user interface and MEXE provides the basic functionality of the mobile station. In this example it is assumed that MEXE communicates with the outside world (the user interface of the mobile station and the radio network) only via the basic functionality of the mobile station.

In this example events are divided into four main steps 4-1 . . . 4-4, each comprising sub-steps a . . . e. In step 4-1a the user gives a command over the user interface of the mobile station to shift to configuration of the intelligent network service. The command can be given via the menu structure of the mobile station, for example. In step 4-1b the basic functionality of the mobile station gives an MMI API excitation (MMI=Man to Machine Interface, API=Applications Programming Interface) to the MEXE layer. Next the MEXE layer infers if the intelligent network has to be inquired about a status information. The inquiry is necessary if the configuration routine extending the user interface is not loaded in the mobile station and/or if the current status information of the service is wished to be retrieved from the intelligent network. If the status information is made, MEXE gives an MMI API call in step 4-1c, as a result of which the inquiry is packed and transmitted over a USSD API interface to the mobile services switching centre MSC in step 4-1d. The mobile services switching centre recognizes the message in the manner described in connection with FIGS. 1 and 2 and forwards the message to the service control point in step 4-1d. In steps 2-2a . . . 4-2c the SCP and MSC return the current status information to the MEXE layer. In step 4-2d the MEXE layer transmits an MMI API call, as a result of which the conventional user interface of the mobile station is extended by the configuration routine of the intelligent network service according to the invention. If the status information was retrieved from the intelligent network in steps 4-1c . . . 4-2c, or if the status information was stored in the memory of the mobile station, the current status information is converted from the machine-oriented presentation into the human-oriented presentation and displayed in accordance with the invention to the user through the mobile station user interface, see FIG. 3. In step 4-3a the user completes the editing of the configuration information, and the configuration routine converts the configuration information from the human-oriented presentation to the machine-oriented presentation. The following steps correspond technically to the steps already described, except that in this case the mobile station does not transmit the configuration information inquiry and/or the configuration routine inquiry, but it transmits the changed configuration information. The intelligent network transmits an acknowledgement indicating the changed status of the configuration information. Step 4-4 together with its sub-steps is an acknowledgement by nature and is therefore not essential to the invention.

The embodiment of FIG. 4 can be modified in a manner such that the shift to configuration in step 4-1a does not necessarily require measures taken by the user but after it is detected in connection with location update, for example, that the supply of services has changed, the change of configuration is activated by the extension that is loaded in the mobile station.

Figure 5:
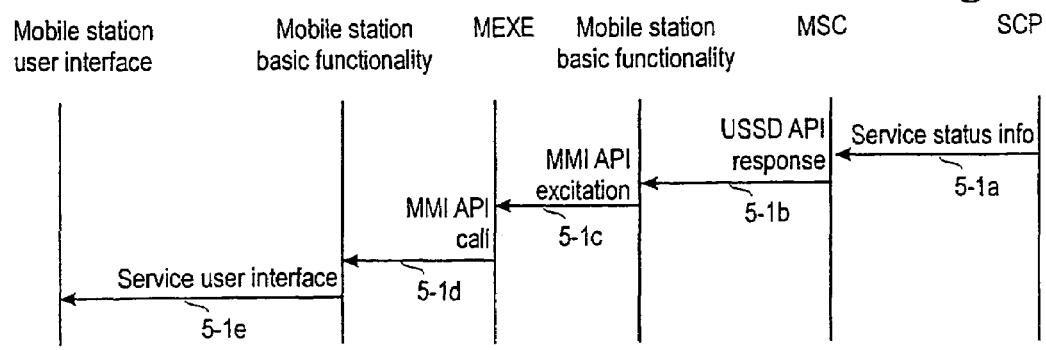

FIG. 5 illustrates the fact that events may be activated at the service control point SCP of the intelligent network. Messages 5-1a . . . 5-1e technically correspond to the messages 4-2a . . . 4-2e. An operator, for example, may utilize this embodiment by spontaneously transmitting a new service for trial and possibly deleting the service later on if the subscriber does not decide to put the service permanently into use.

The invention provides the user and the operator with an easy and flexible manner for configuring intelligent network services. Use of radio resources is minimized, because the configuration information is completely edited in the mobile station and transmitted to the service control point after the editing. A prerequisite for the invention is that the mobile station comprises an expandable user interface. A technical implementation of the extension layer EXE may be an extension of the operating system, enabling the loading of new machine-language program modules in the mobile station. MEXE may also contain an interpreter of a language to be interpreted, such as a JAVA Script interpreter. In other respects, the invention does not require changes to the known equipment. Software of the mobile services switching centre has to be improved so as to enable the mobile services switching centre to separate the configuration messages of the intelligent network service from other short messages or USSD messages and transmit the configuration messages to the service control point as presented above. The service control point SCP preferably follows the ETSI CAMEL protocol (Customized Applications for Mobile Network Enhanced Logic). Short messages, USSD or packet data messages, such as X.25, are preferably used between MEXE and the SCP. IP addresses or X.25 addresses can be used to individualize the SCP. A wireless transport protocol (WTP) can be used on other protocols as a higher-level protocol. An OSI (Open System Interconnection) ROSE service element or the like can be used on the session protocol to support remote procedure calls. SCP software has to be improved so as to enable the SCP to communicate with the mobile station as described in connection of FIGS. 1 to 4.

The invention is disclosed by way of example in connection with a mobile communication system of the GSM type. However, the mobile communication system plays a small part in the generation of a service of the invention. A network element (such as the above mobile services switching centre MSC) of the mobile communication system recognizes the configuration message and transmits at least the essential part of the message to the service control point (SCP). This functionality can also be implemented in a base station or in a base station controller, for example. When a packet-switched GPRS network or a packet-switched GPRS service is involved, the corresponding functionality can be implemented at SGSN or GGSN nodes, for example.

Correspondingly, implementing the service at the service control point SCP on the intelligent network side is only a potential example. It is also possible that the intelligent network service is executed from one node, but it is configured from a second node and its information (service information) is stored in a third node. The intelligent network service information can be accessed from a node called a service management point SMP which is responsible for service management, providing services to subscribers and introducing services. The SMP may contain the primary copies of service data bases. Service information can also be maintained in a node called service management access point SMAP which provides a network operator, for example, with a user interface for service information management. As is well known, the last letter 'P' of the nodes SMP and SMAP stands for a point, or a node, which executes a given function. If the corresponding function as such is referred to, the last letter is 'F' for function. The interface of the management node configuring intelligent network services to the service control point SCP preferably takes place according to an open interface, i.e. according to an Open Service architecture recommendation. Furthermore, a service-specific application protocol agreed on is preferably used between the configuration routine of the mobile station and the management application which configures an intelligent network service. This application protocol can be used on a standard transport protocol or session protocol. The configuration routine may, for example, collect information by using the MMI (Man-Machine Interface) API (Application Programming Interface), generate a configuration message and transmit the message by an API suitable for data message transmission. Such a routine can be implemented for example by a JAVA language.

It will be apparent to those skilled in the art that progress in technology enables the basic idea of the invention to be implemented in many ways. Therefore, the invention and its embodiments are not restricted to the above examples, but they may vary within the scope of the claims.

What is claimed is:

1. A method of configuring an intelligent network service over a user interface of a mobile station by means of a management application located at an intelligent network node when the mobile station is connected to a mobile communication system which is, in turn, connected to an intelligent network, the mobile station comprising an extension layer to support installable routines; the method comprising:

loading a configuration routine of the intelligent network service in question in the mobile station;

at least one of the extension layer and the configuration routine connected to the mobile station receiving an input to configure the intelligent network service, generating configuration information on the basis of the input and transmitting the configuration information in a configuration message through a network element of the mobile communication system to said intelligent network node;

the intelligent network node interpreting the configuration information included in the configuration message and configuring the intelligent network service; and the mobile station transmitting a configuration information inquiry before the configuration message.

2. The method as claimed in claim 1, wherein the configuration routine is entirely installed in the mobile station before the configuration information inquiry.

3. The method as claimed in claim 1, wherein the configuration routine is installed only partly, or not at all, in the mobile station before the configuration information inquiry and the network transmits the configuration routine or at least the missing parts of the configuration routine as a response to the configuration information inquiry.

4. The method as claimed in claim 3, wherein the network transmits the configuration routine or the missing parts thereof only if requested by the mobile station.

5. The method as claimed in claim 1, wherein the network element of the mobile communication system recognizes the configuration message and transmits at least the essential part thereof to the said intelligent network node.

6. The method as claimed in claim 1, wherein the messages between the mobile station and the network element of the mobile communication system are transparent for the portion of the network between the mobile station and the element of said mobile communication system and the network element of the mobile communication system recognizes upward and downward messages and forwards the essential parts of the messages correspondingly to the intelligent network node or the mobile station.

7. The method as claimed in claim 6, wherein the network element of the mobile communication system recognizes that the message is a configuration message on the basis of the fact that the message contains an intelligent network service identifier and preferably a special character that seldom occurs in a normal text.

8. The method as claimed in claim 6, wherein the network element of the mobile communication system recognizes that the message is a configuration message on the basis of the fact that the mobile station transmits the message to a telephone number allocated to the intelligent network service.

9. The method as claimed in claim 1, wherein in connection with changes in the intelligent network service the intelligent network node automatically transmits a notification to the mobile station.

10. The method as claimed in claim 1, wherein in connection with the changes in the intelligent network service the intelligent network node automatically activates the loading of a new configuration routine for the mobile station.

11. The method as claimed in claim 1, wherein the messages between the mobile station and the network element of the mobile communication system are data messages, such as short messages or USSD messages.

12. A mobile station comprising an extension layer to support routines to be installed, wherein:

the mobile station comprises a configuration routine of an intelligent network service, the routine being arranged to provide the extension layer with an input to configure the intelligent network service;

as a response to the input, the mobile station is arranged to transmit configuration information to a mobile telephone network, the configuration information being formatted such that when forwarded to the intelligent network, it affects the behavior of the intelligent network service until transmission of the next configuration information; and the mobile station is arranged to transmit a configuration information inquiry before the configuration message.

13. An arrangement for configuring over a user interface of a mobile station an intelligent network service controlled by an intelligent network node when the mobile station comprises an extension layer to support installable routines, wherein:

the mobile station comprises a configuration routine of the intelligent network service, the routine being arranged to provide the extension layer with an input to configure the intelligent network service;

as a response to the input, the mobile station is arranged to transmit configuration information through a network element of the mobile communication system to the intelligent network node, the configuration information being formatted such that when forwarded to the intelligent network, it affects the behavior of the intelligent network service until transmission of the next configuration information;

the intelligent network node is arranged to interpret the configuration information included in the configuration message and configure the intelligent network service on the basis of the configuration information; and the mobile station is arranged to transmit a configuration information inquiry before the configuration message.

14. The method of claim 1, wherein the mobile station transmitting step comprises the mobile station transmitting the configuration information inquiry to said intelligent network node before transmitting the configuration message to determine which parts of a configuration routine are needed to implement requested services.

15. The mobile station of claim 12, wherein the mobile station is arranged to transmit a configuration information inquiry to said intelligent network node before transmitting the configuration message to determine which parts of a configuration routine are needed to implement requested services.

16. The arrangement of claim 13, wherein the mobile station is arranged to transmit a configuration information inquiry to said intelligent network node before the configuration message to determine which parts of a configuration routine are needed to implement requested services.

\* \* \* \* \*